United States Patent Office
2,925,113
Patented Feb. 16, 1960

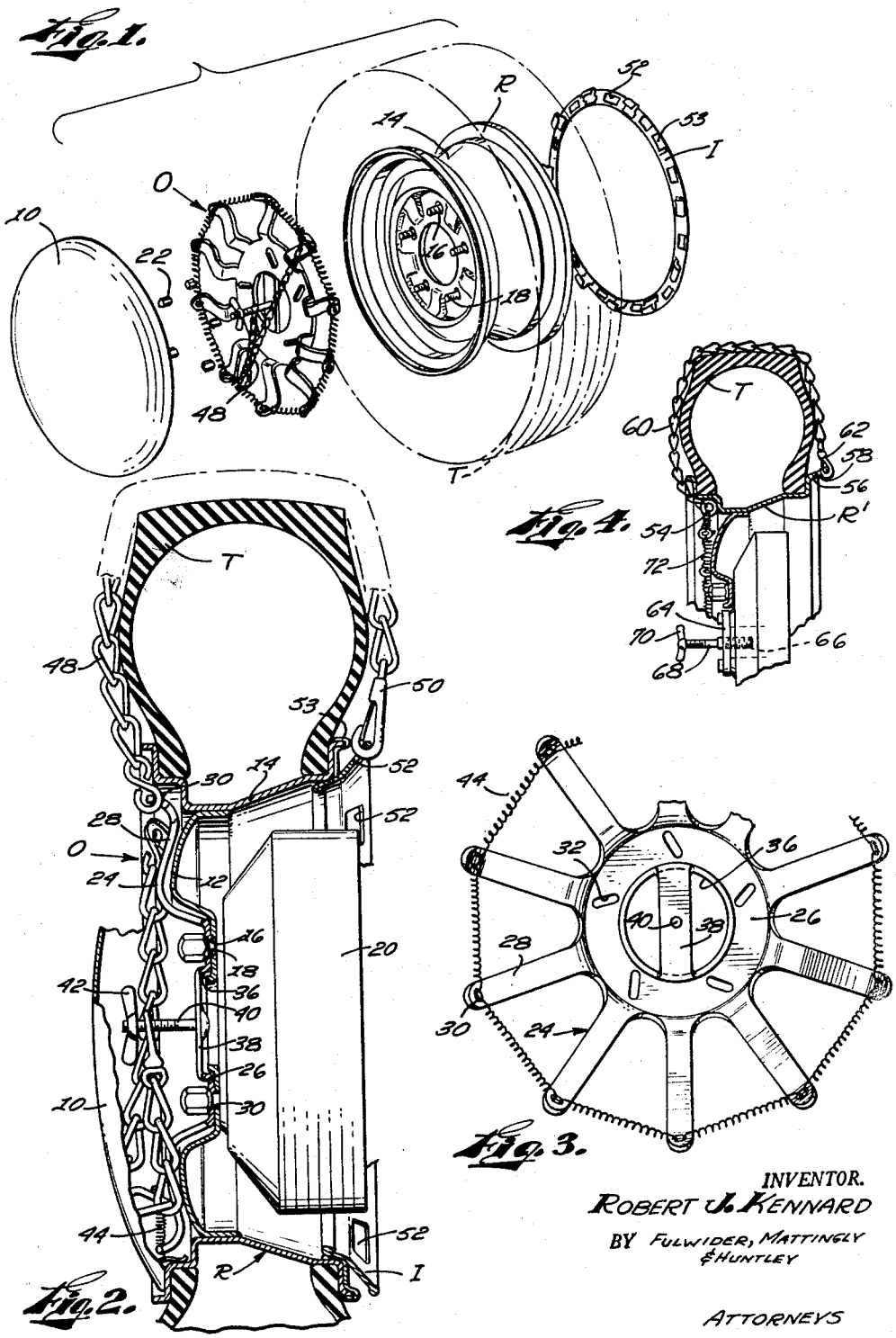

2,925,113

AUTOMOBILE TIRE CHAIN APPARATUS

Robert J. Kennard, Long Beach, Calif., assignor of one-fourth each to Ruth E. Kennard, Arnold T. Johnston, and M. Corene Johnston Application October 21, 1958, Serial No. 768,778

10 Claims. (Cl. 152—233)

The present invention generally relates to the automotive field and more particularly to an anti-skid tire chain for use with the wheels of an automobile.

When an automotive vehicle is to be operated over slippery roads, it is conventional practice to apply anti-skid tire chains to the wheels of the automobile. These tire chains are generally stored in a suitable place within the automobile's interior. It is well-known that the task of installing the chains on the wheels is both time-consuming and disagreeable. Additionally, it often happens that the slippery road conditions are unexpectedly encountered at a time when the tire chains are not stored within the automobile. Where the conventional automobile tire chains are stored within the automobile they occupy considerable space which is therefore unavailable for storing other items.

It is a major object of the present invention to provide an automobile tire chain which is adapted to remain on the wheel of the automobile at all times. During normal use of the automobile, the tire chain is hidden from view in a stored position. When the automobile driver encounters slippery road conditions, the tire chain may be readily moved to a tire-encircling operative position.

Another object of the present invention is to provide an automobile tire chain of the aforedescribed nature which may be readily moved from a stored position to a tire-encircling operative position in a minimum amount of time and without the use of any special tools.

Yet another object of the present invention is to provide an automobile tire chain of the aforedescribed nature incorporating means for preventing rattling while the chain is disposed in its stored position on the automobile wheel.

It is an additional object of the invention to provide an automobile tire chain of the aforedescribed nature which may be utilized on existing automotive vehicles by effecting minor modifications of the wheels of such vehicles. Alternately, the automobile tire chain of the present invention may be readily incorporated on the wheels of new equipment.

It is a further object of the present invention to provide an automobile tire chain of the aforedescribed nature which is simple in design and rugged of construction whereby it may afford a long and trouble-free service life.

A further object of the present invention is to provide an automobile tire chain of the aforedescribed nature which may be readily removed from its stored position on the wheel when it is necessary to effect a tire changing operation.

These and other objects and advantages of the present invention will become apparent from the following detailed description, when taken in conjunction with the appended drawings wherein:

Figure 1 is a horizontally exploded perspective view showing a first form of automobile tire chain apparatus embodying the present invention;

Figure 2 is a fragmentary central vertical sectional view of said apparatus in enlarged scale;

Figure 3 is a side elevational view of a spider member forming a part of said apparatus; and Figure 4 is a fragmentary central vertical sectional view showing a second form of automobile tire chain apparatus embodying the present invention.

Referring to the drawings, and particularly Figures 1, 2 and 3 thereof, there is shown a drop-center wheel rim R of conventional construction whereon is mounted a conventional pneumatic tire T, the latter being shown in phantom outline in Figure 1. The outwardly-facing side of the wheel rim R is adapted to receive the outer member O of a first form automobile tire chain apparatus embodying the present invention. The inwardly-facing side of the wheel rim R is adapted to receive the inner member I of this automobile tire chain apparatus. A hub cap or wheel cover 10 of conventional construction is also received by the outwardly-facing side of the wheel rim R so as to cover the outer member O of the automobile tire chain apparatus when the latter is in its stored position of Figure 1. In Figure 2, the automobile tire chain apparatus is shown in its tire-encircling operative position.

More particularly, the wheel rim R includes a generally radially extending mounting element 12, the outer periphery of which is rigidly affixed as by welding to a generally transversely extending tire-receiving element 14. The front and rear portions of the element 14 are suitably flanged to receive the tire T. The radially inner portion of the mounting element 12 is formed with a plurality of circumferentially spaced bores 16 adapted to receive the mounting studs 18 carried by a conventional drum member 20. The mounting studs 18 receive lug nuts 22, with the latter conventionally being employed to secure the wheel rim R to the drum member 20.

The aforementioned outer member O of the first form of automobile tire chain apparatus embodying the present invention includes a spider member, generally designated 24. This spider member 24 includes a mounting ring 26 from which a plurality of chain support-arms 28 extend radially. The spider 24 is of integral construction and as indicated in Figures 1 and 2, the intermediate portion of the chain support-arms 28 are curved outwardly so as to clear the mounting element 12 of the wheel rim R. The upper ends of the arms 28 are formed with a reverse curve and terminate radially inwardly of the outer part of the element 14 of the wheel rim R. The ends of each arm 28 are formed with a bore 30. The mounting ring 26 is formed with a plurality of elongated slots 32. These slots 32 are circumferentially spaced to conform with the spacing of the mounting studs 18 and are disposed at an angle relative to a radius of the mounting ring 26.

The mounting ring 26 defines a central opening 36. The center portion of this opening 36 is bridged by an integral web 38. The web 38 is centrally bored so as to receive an externally threaded keeper post 40 that extends outwardly relative to the wheel rim R. The keeper post 40 receives a wing nut 42. A conventional coil tension spring 44 extends between each of the bores 30 of the chain support-arms 28. Referring to Figure 2, it will be apparent that the mounting spider 24 is secured to the aforedescribed studs 18 by the lug nuts 22, the studs 18 being received by the elongated slots 32. It is important to note that the angular disposition of these mounting slots 32 relative to the ring 26 permits a single size mounting spider 24 to be employed with the varying spaced wheel mounting studs of several different types of automotive vehicles.

As will be apparent by a reference to Figure 2, each of the bores 30 of the chain support-arms 28 receives one end of an anti-skid chain length 48. The opposite end of each of these chain lengths 48 are affixed to a conventional snap hook 50. The snap hooks 50 are adapted to be engaged with a plurality of apertures 52 formed in the aforementioned inner member I when the chain lengths are moved to a tire-encircling operative position. The inner member I is of annular configuration and is formed with a plurality of circumferentially spaced clips 53 that engage the inwardly-facing portion of the tire-receiving element 14 of the wheel rim R and are rigidly affixed thereto as by welding. The member I extends generally radially outwardly and upwardly relative to the wheel rim R and is preferably of integral construction. During normal driving conditions the snap hooks 50 are snapped about the aforementioned keeper post 40 and are prevented against outward movement therealong by means of the wing nut 42. As shown clearly in Figure 1, prior to the time the snap hooks 50 of each chain length 48 are so secured to the keeper post 40 they are extended about the tension spring 44 generally diametrically opposite their respective chain support-arms 28. This arrangement insures that the chain length 48 are constantly maintained under tension so as to prevent their rattling when disposed in a stored, inoperative position. As will be apparent by reference to Figure 2, the wheel cover or hub cap 10 will completely hide the mounting spider and its attached parts when the chain lengths 48 are disposed in their stored position.

In the operation of the aforedescribed first form of apparatus, to move the chain lengths 48 to a tire-encircling operative position, the wheel cover or hub cap 10 is first pried loose from the wheel rim R. Thereafter, the snap hooks 50 are disengaged from the keeper post 40 and the chain lengths are extended radially outwardly around the tire T from their respective chain support-arms whereby each snap hook may be inserted through one of the apertures 52 of the inner member I, as indicated in the upper portion of Figure 2. This operation requires a minimum amount of time and may be accomplished without the use of any special tools. It is moreover unnecessary to jack up the automotive vehicle or to deflate its tires T in order to carry out the tire encircling operation. When the chain lengths 48 are no longer required in order to obtain proper wheel traction, the snap hooks 50 are again disengaged from the apertures 52 of the inner member I and returned to their original position upon the keeper post 40.

The aforedescribed first form of tire chain apparatus embodying the present invention is particularly designed for use with existing conventional automotive vehicles. Referring now to Figure 4, there is shown a second form of tire chain apparatus embodying the present invention which especially lends itself to incorporation with new automotive vehicles during the manufacture thereof. This second form of tire chain apparatus is usable with a conventional wheel rim R' generally similar to that described hereinbefore in conjunction with Figures 1, 2 and 3. The outwardly-facing portion of the wheel rim R', however, is integrally formed with a plurality of eye elements 54, while the inwardly-facing portion of the wheel rim R' includes a plurality of integral ears 56 each having an aperture 58 formed therein. The eye elements 54 each receive one end of an anti-skid chain length 60. The free end of each chain length 60 is formed with a snap hook 62 which is engageable with the aforementioned apertures 58 when the chain lengths are disposed in a tire-encircling position. The axle flange 64 of the automotive vehicle is formed with a threaded socket 66 which receives the rear portion of an externally threaded keeper post 68 similar to the aforedescribed keeper post 40. The keeper post 68 is provided with a conventional wing nut 70. The eye elements 54 are interconnected by a plurality of conventional coil tension springs 72 similar to the springs 44 described hereinbefore in conjunction with Figures 1, 2 and 3. When the chain lengths 60 are to be moved to a stored, inoperative position, the snap hooks 62 are each disengaged from the apertures 58 and the intermediate portions of the chain lengths 60 extended about a spring 72 generally diametrically opposite the chain length's respective eye 54. Thereafter, the snap hook 62 is engaged with the keeper post 68 and will remain under tension so as to be rattle-free. It will be readily apparent that the aforedescribed form of apparatus of Figure 4 may be readily and inexpensively incorporated in new automotive equipment.

Various modifications and changes may be made with respect to the foregoing detailed description without departing from the spirit of the present invention or the scope of the following claims.

I claim:

1. Tire chain apparatus for use with an automobile wheel, comprising: a plurality of circumferentially spaced eye-defining elements attached to the outwardly-facing side of said wheel; means defining a plurality of circumferentially-spaced apertures attached to the inwardly-facing side of said wheel; a keeper element coaxially carried by said wheel and extending outwardly relative thereto; a plurality of tension elements, each extending between adjoining eye-defining elements; a plurality of chain lengths, each having an end affixed to one of said eye-defining elements; and a fastener on the free end of each of said chain lengths, said fasteners being selectively engageable in the inoperative position with said keeper element after its respective chain length has been looped about one of said tension elements, or alternatively in the operative position with one of said apertures.

2. Tire chain apparatus for use with an automobile wheel, comprising: a plurality of circumferentially spaced eye-defining elements attached to the outwardly-facing side of said wheel; means defining a plurality of circumferentially-spaced apertures attached to the inwardly-facing side of said wheel; a keeper post coaxially carried by said wheel; a plurality of tension springs, each extending between adjoining eye-defining elements; a plurality of chain lengths, each having an end affixed to one of said eye-defining elements; and a fastener on the free end of each of said chain lengths, said fasteners being selectively engageable in the inoperative position with said keeper post after its respective chain length has been looped about one of said tension springs, or alternatively in the operative position with one of said apertures.

3. Tire chain apparatus for use with an automobile wheel, comprising: a plurality of circumferentially spaced eye-defining elements attached to the outwardly-facing side of said wheel; means defining a plurality of circumferentially-spaced apertures attached to the inwardly-facing side of said wheel; a keeper post coaxially carried by said wheel; a plurality of tension springs, each extending between adjoining eye-defining elements; a plurality of chain lengths, each having an end affixed to one of said eye-defining elements; and a snap hook on the free end of each of said chain lengths, said snap hooks being selectively engageable in the inoperative position with said keeper post after its respective chain length has been looped about one of said tension springs, or alternately in the operative position with one of said apertures.

4. Tire chain apparatus for use with an automobile wheel, comprising: a spider secured to the outwardly-facing side of said wheel, said spider having a plurality of radially outwardly extending chain support-arms; means defining a plurality of circumferentially-spaced apertures attached to the inwardly-facing side of said wheel; a keeper element coaxially carried by said spider and extending outwardly relative thereto; a plurality of tension elements, each extending between the free ends of adjoining chain support-arms; a plurality of chain lengths, each having an end affixed to one of said chain support-arms; and a fastener on the free end of each of said chain lengths, said fasteners being selectively engageable in the inoperative position with said keeper element after its respective chain length has been looped around one of said tension elements so as to place said chain length under tension, or alternately in the operative position with one of said apertures after said chain length has been looped around said tire.

5. Apparatus as set forth in claim 4 wherein said aperture-defining means comprises an annular member that is affixed to the inwardly-facing side of said wheel by means of clips formed on said annular member.

6. Tire chain apparatus for use with an automobile wheel, comprising: a spider secured to the outwardly-facing side of said wheel, said spider having a plurality of radially outwardly extending chain support-arms; means defining a plurality of circumferentially-spaced apertures attached to the inwardly-facing side of said wheel; a keeper post coaxially carried by said wheel; a plurality of tension springs, each extending between the free ends of adjoining chain support-arms; a plurality of chain lengths, each having an end affixed to one of said chain support-arms; a fastener on the free end of each of said chain lengths, said fasteners being selectively engageable in the inoperative position with said keeper post after its respective chain length has been looped around one of said tension springs so as to place said chain length under tension, or alternately in the operative position with one of said apertures after said chain length has been looped around said tire.

7. Tire chain apparatus for use with an automobile wheel, comprising: a spider member having a mounting ring from which extends a plurality of chain support-arms, said mounting ring being formed with a plurality of wheel mounting stud-receiving slots that are each disposed at an angle relative to a radius of said mounting ring; means defining a plurality of circumferentially-spaced apertures attached to the inwardly-facing side of said wheel; a keeper element coaxially carried by said spider and extending outwardly relative thereto; a plurality of tension elements, each extending between the free ends of adjoining chain support-arms; a plurality of chain lengths, each having an end affixed to one of said chain support-arms; and a fastener on the free end of each of said chain lengths, said fasteners being selectively engageable in the inoperative position with said keeper element after its respective chain length has been looped around one of said tension elements so as to place said chain length under tension, or alternately in the operative position with one of said apertures after said chain length has been looped around said tire.

8. Apparatus as set forth in claim 7 wherein said aperture-defining means comprises an annular member that is affixed to the inwardly-facing side of said wheel by means of clips formed on said annular member.

9. Tire chain apparatus for use with an automobile wheel, comprising: a plurality of circumferentially-spaced eye elements formed on the outwardly-facing side of said wheel; a plurality of circumferentially spaced ears on the inwardly-facing side of said wheel, each ear being formed with an aperture; a keeper element coaxially carried by said wheel and extending outwardly relative thereto; a plurality of tension elements, each extending between adjoining eye elements; a plurality of chain lengths, each having an end affixed to one of said eye elements; and a fastener on the free end of each of said chain lengths, said fasteners being selectively engageable in the inoperative position with said keeper element after its respective chain length has been looped around one of said tension elements so as to place said chain length under tension, or alternately in the operative position with one of said apertures after said chain length has been looped around said tire.

10. Tire chain apparatus for use with an automobile wheel, comprising: a plurality of circumferentially-spaced eye elements formed on the outwardly-facing side of said wheel; a plurality of circumferentially spaced ears on the inwardly-facing side of said wheel, each ear being formed with an aperture; a keeper post coaxially carried by said wheel and extending outwardly relative thereto; a plurality of tension springs, each extending between adjoining eye elements; a plurality of chain lengths, each having an end affixed to one of said eye elements; and a fastener on the free end of each of said chain lengths, said fasteners being selectively engageable in the inoperative position with said keeper post after its respective chain length has been looped around one of said tension springs so as to place said chain length under tension, or alternately in the operative position with one of said apertures after said chain length has been looped around said tire.

References Cited in the file of this patent
UNITED STATES PATENTS

| | | |
|---|---|---|
| 1,786,229 | Conrow | Dec. 23, 1930 |
| 2,204,783 | Wettlaufer | June 18, 1940 |
| 2,751,958 | Weddington | June 26, 1956 |